United States Patent [19]

Brazelton et al.

[11] Patent Number: 5,316,031

[45] Date of Patent: May 31, 1994

[54] VALVE WITH INDEPENDENT CONTROL OF DISCHARGE THROUGH PLURALITY OF ORIFICES

[76] Inventors: Carl L. Brazelton, 1290 W. Bourbonnais St., Kankakee, Ill. 60901; Yong H. Kim, 590 Lakeview Ct., Bourbonnais, Ill. 60914

[21] Appl. No.: 907,225

[22] Filed: Jul. 1, 1992

Related U.S. Application Data

[60] Division of Ser. No. 691,459, Apr. 25, 1991, Pat. No. 5,135,968, which is a continuation-in-part of Ser. No. 657,829, Feb. 19, 1991, Pat. No. 5,252,635, which is a division of Ser. No. 595,313, Oct. 10, 1990, Pat. No. 5,061,456, which is a division of Ser. No. 89,344, Aug. 25, 1987, abandoned, Ser. No. 691,459, Aug. 25, 1987, which is a continuation-in-part of Ser. No. 382,613, Jul. 19, 1989, Pat. No. 5,018,871, and a continuation-in-part of Ser. No. 370,375, Jun. 22, 1989, Pat. No. 5,164,429, which is a continuation-in-part of Ser. No. 89,344, Aug. 25, 1987, abandoned.

[51] Int. Cl.[5] ............... E03B 1/00; F16K 11/00
[52] U.S. Cl. ................... 137/1; 137/627.17
[58] Field of Search .......... 137/625.17, 637.3, 637.4; 239/446

[56] References Cited

U.S. PATENT DOCUMENTS

| 142,120 | 8/1973 | Richardson et al. | 137/637.4 |
|---|---|---|---|
| 1,896,051 | 3/1972 | Hamlin et al. | 260/29.2 TN |
| 2,008,684 | 7/1935 | Craddock | 366/168 |
| 2,212,260 | 8/1940 | Brothman | 366/168 |
| 2,249,263 | 7/1941 | Wheelwright, Jr. | 366/168 |
| 2,268,461 | 12/1941 | Nichols | 366/168 |
| 2,556,014 | 6/1951 | Tolman | 366/168 |
| 2,651,582 | 9/1953 | Courtney | 106/167 |
| 2,686,110 | 8/1954 | Carver | 366/168 |
| 2,740,669 | 4/1956 | Longwell | 210/511 |
| 2,911,006 | 11/1959 | Vogel | 137/625.17 |
| 2,979,082 | 4/1961 | Neves | 137/625.17 |
| 3,146,795 | 9/1964 | Retallick | 137/625.17 |
| 3,233,630 | 2/1966 | Strand | 137/625.17 |
| 3,252,689 | 5/1966 | Blomgren, Sr. et al. | 366/168 |
| 3,319,937 | 5/1967 | Wilson et al. | 366/168 |
| 3,389,970 | 6/1968 | Scheibel | 210/511 |
| 3,536,646 | 10/1970 | Hatch et al. | 260/29.2 |
| 3,559,959 | 2/1971 | Davis et al. | 366/168 |
| 3,742,735 | 7/1973 | Verreyne et al. | 366/196 |
| 3,747,899 | 7/1973 | Latinen | 366/168 |
| 3,756,570 | 9/1973 | Buhner | 366/295 |
| 3,852,234 | 12/1974 | Venema | 523/219 |
| 4,113,688 | 9/1978 | Pearson | 523/324 |
| 4,125,574 | 11/1978 | Kastner et al. | 525/317 |
| 4,171,166 | 10/1979 | Trowbridge et al. | 366/316 |
| 4,217,145 | 8/1980 | Gaddis | 106/170 |
| 4,218,147 | 8/1980 | Rosenberger | 366/162 |
| 4,233,265 | 11/1980 | Gasper | 422/135 |
| 4,243,636 | 1/1981 | Shiraki et al. | 422/225 |
| 4,433,701 | 2/1984 | Cox et al. | 137/101.19 |
| 4,470,907 | 9/1984 | Sencza | 210/192 |
| 4,522,502 | 6/1985 | Brazelton | 366/168 |
| 4,664,528 | 5/1987 | Rodgers et al. | 366/142 |
| 4,701,055 | 10/1987 | Anderson | 366/336 |
| 5,018,870 | 5/1991 | Brazelton et al. | 366/161 |
| 5,018,871 | 5/1991 | Brazelton et al. | 366/168 |

FOREIGN PATENT DOCUMENTS

| 257740 | 3/1988 | European Pat. Off. | 366/168 |
|---|---|---|---|
| 80951 | 2/1979 | Luxembourg | 366/168 |

*Primary Examiner*—Joseph W. Drodge
*Attorney, Agent, or Firm*—Welsh & Katz, Ltd.

[57] ABSTRACT

A valve for diluting and activating polymer molecules used in wastewater treatment is designed to divert a desired amount of dilution water around the primary dilution and activation apparatus to the inlet of the secondary dilution apparatus. Water in the valve passes through a slot which extends through about 180 degrees. The ends of the slots have square corners, so that the total volume of water which passes through the valve and the relative proportion of water which passes through the primary and secondary activation apparatus can be adjusted independently of each other. In this manner, a control system can be used which only requires information regarding the total amount of water supplied to the system in order to execute operator instructions as to the total volume of water required and the proportions of water to be supplied to the primary and secondary dilution apparatus.

5 Claims, 5 Drawing Sheets

VALVE WITH INDEPENDENT CONTROL OF DISCHARGE THROUGH PLURALITY OF ORIFICES

This is a divisional of Ser. No. 07/691,459, filed Apr. 25, 1991, now U.S. Pat. No. 5,135,968, which in turn is a continuation-in-part of Ser. No. 07/657,829, filed Feb. 19, 1991, now U.S. Pat. No. 5,252,635, which in turn is a divisional of Ser. No. 07/595,313, filed Oct. 10, 1990, now U.S. Pat. No. 5,061,456, which in turn is a divisional of Ser. No. 07/089,344, filed Aug. 25, 1987, now abandoned. Ser. No. 07/691,459, filed Apr. 25, 1991, now U.S. Pat. No. 5,135,968, is also a continuation in-part of Ser. No. 07/382,613, filed Jul. 19, 1989, now U.S. Pat. No. 5,018,871. Ser. No. 07/691,459, filed Apr. 25, 1991, now U.S. Pat. No. 5,135,968, is also a continuation-in-part of Ser. No. 07/370,375, filed Jun. 22, 1989, now U.S. Pat. No. 5,164,429, which in turn is a continuation-in-part of Ser. No. 07/089,344, filed Aug. 25, 1987, now abandoned.

BACKGROUND OF THE INVENTION

This invention relates to apparatus which mixes a polymeric flocculant in dilution water and activates the polymer for liquid/solid separation, as in water and waste-water treatment, and more particularly, to polymer activation and dilution apparatus which produces more rapid and complete activation of the polymer in less processing and aging time than known apparatus, without damaging the polymer structures excessively.

Flocculants and coagulants such as polyelectrolyte materials, polymers, gums and the like ("polymers") are high molecular-weight materials used, among other things, as an aid in removing suspended particles from water, for dewatering sludges, and for other liquid/solid separation applications. The polymers are tightly tangled before activation, and extend or untangle when fully activated in dilution water.

The degree to which a polymer facilitates coagulation and flocculation is improved with greater polymer activation. Polymer activation can perhaps best be measured, for example, by applying an activated polymer to a substrate such as sludge or the like, and measuring the rate of settling under laboratory conditions. The highest rate of settling is indicative of the best possible polymer performance, which is believed to occur when the polymer molecules are at or reasonably close to being fully untangled or activated.

Another indication of the degree of polymer activation is viscosity. Generally, viscosity increases as the polymer becomes untangled or better activated. However, the degree of potential activation is related to the chemical structure of the polymer, the chemical properties of the dilution water in which the polymer is mixed, and the manner in which the polymer is mixed with the dilution water. As a result, a particular polymer may reach a different maximum viscosity in different water solutions or under different mixing conditions. By activating several samples of a particular polymer under varying time and energy conditions, while using a single source of dilution water optimum activation can be determined by measuring and comparing the viscosity of the samples over time. Optimum activation conditions are considered to be those conditions which produce maximum viscosity with the least amount of processing time and aging time (after processing).

The polymer/dilution water solution can be mixed under various energy and time conditions. In commercial applications, it is important that polymers be diluted and activated as quickly and completely as possible, without damaging the polymer molecules. To this end, apparatus which is used for polymer activation and dilution has been refined to more efficiently and more effectively activate the polymer molecules, without destroying them. For example, U.S. Pat. No. 4,522,502 discloses a single stage mixing device which activates polymers very well.

Co-pending patent application Ser. Nos. 07/657,829, filed Feb. 19, 1991, and 07/370,375, filed Jun. 22, 1989, disclose two-stage mixing apparatus which activate polymers more effectively and efficiently than the single stage mixing device disclosed in U.S. Pat. No. 4,522,502. In the two-stage mixing apparatus, the polymer molecules are subjected to relatively high shear forces for a short period of time in a first processing zone, followed by lower shear forces for a longer period of time in a second processing zone. However, the shear forces are substantially constant within each processing zone. In any event, still further improved activation is desirable.

When activated polymers are used in wastewater treatment plants, the flow volume and composition of the wastewater determines the amount of activated polymer which is needed to properly treat the water. If the character of the wastewater changes, the proportion of polymer in the dilution water, and/or the amount of polymer which is needed, must be adjusted accordingly. Also, changes in the characteristics of the polymer molecules sometimes requires adjustment of the proportion of polymer in the dilution water. For example, the viscosity of many Mannich polymers increases significantly after about 60 days in inventory, which requires the application of higher shear forces and longer residence times in mixing equipment to achieve best performance. A third mixing stage contains elements for a second stage of dilution which provides the flexibility needed to produce optimum hydrodynamic mixing energy and time levels for such circumstances. In the third mixing stage, the polymer processed in the first and second processing zones of two-stage mixing equipment is further diluted with water and processed through a static mixer. The static mixer in the third stage, and the equipment which determines the relative amounts of water and polymer which pass through the static mixer and the two-stage mixing equipment, are known here as post-dilution apparatus.

Known post-dilution equipment is relatively complicated, and often requires several adjustments. In some cases, for example, adjusting the ratio of fresh water which enters the first and second processing zones (predilution) water to fresh water which enters the third processing zone (post-dilution) affects the total volume of water. In other cases, adjusting the pre-dilution water affects the post-dilution water, and vice versa. When this happens, the operator must compensate for the undesired changes, sometimes several times. Thus, there is a need for post-dilution polymer mixing apparatus which is less complicated, and is easier to adjust.

Wastewater treatment facilities are becoming increasingly automated to improve overall performance. However, the relatively complicated nature of the post-dilution systems just described increase the difficulty of automating such facilities. Thus, there is also a need for post-dilution polymer mixing apparatus which is easily adaptable to automation equipment.

Accordingly, one object of this invention is to provide new and improved polymer mixing apparatus.

Another object is to provide new and improved apparatus for diluting and activating polymers in water for use in removing fine particulate matter from wastewater Still another object is to provide new and improved polymer activation apparatus with improved activating characteristics.

A still further object is to provide new and improved polymer activation apparatus which is relatively simple in construction, and is readily adaptable to automated control.

SUMMARY OF THE INVENTION

In keeping with one aspect of this invention, apparatus for diluting and activating polymer molecules includes primary polymer dilution and activation apparatus, secondary dilution apparatus, and apparatus for accurately diverting a desired amount of dilution water around the primary activation apparatus to the secondary dilution apparatus.

The primary dilution and activation apparatus includes a cylindrical first processing zone in which the polymer and dilution water are initially mixed. The first processing zone subjects the polymer molecules to relatively high shear conditions for a relatively short period of time, after which the solution passes into a second processing zone in which the solution is subjected to continuously decreasing shear rates over a longer period of time. The primary dilution and activation apparatus includes both the first and second processing zones.

The shear rates in both the first and second processing zones are primarily produced by a single rotating impeller in the first processing zone. The impeller swirls the solution in the first processing zone of the apparatus, and the swirling continues after the solution enters the second processing zone. However, the swirling action decreases as the solution moves further from the impeller because there is no impeller in the second processing zone. Thus, activation and dilution are active processes in the first processing zone, where there is a rotating impeller, and passive in the second processing zone, where there is no impeller.

The second processing zone includes a plurality of cylindrical, concentric baffles which create a lengthened path of travel for the solution, while still permitting the solution to swirl inside the cylinder. The baffles divide the second processing zone into several annular, concentric spaces which are interconnected to provide a single, continuous path of travel through the second processing zone. While the path is continuous, however, the direction of travel reverses when the solution passes from one annular space to another. The length of the path determines the residence time in the second processing zone, and the cylindrical shape of the apparatus permits the solution to continue swirling in the cylinder. When the solution leaves the primary activation apparatus, it flows into the secondary dilution apparatus, which is a static mixer.

A valve diverts a desired amount of fresh dilution water around the primary dilution and activation apparatus to the secondary dilution apparatus. The valve includes an inlet for the incoming dilution water, and two outlets. The first outlet is connected to the inlet of the primary activation apparatus, and the second outlet is connected to the inlet of the secondary dilution apparatus.

The valve is cylindrical, with the inlet in one end of the cylinder, and the outlets in openings in the cylinder wall. The outlets are separated by about 180 degrees. A rotatable, slidable cylinder fits inside the outer cylinder. The inner cylinder is hollow, with an open end facing the valve inlet and a closed end facing the other end of the valve. A shaft is secured to the closed end of the inner cylinder, to control movement of the inner cylinder inside the valve.

The shaft includes a rectangular or other keyed opening, and a threaded section. The rotational angle of the sleeve is controlled by an appropriate key which fits in the keyed opening, and the axial position of the sleeve is controlled by a wheel which is rotated by an external gear. The wheel has a threaded bore which engages threads on the outer diameter surface of the internally keyed shaft. The wheel is restrained axially in a housing so that the shaft moves axially when the wheel is turned. The wheel can be turned manually, or by means of a reversible electric motor operatively connected to the wheel by gear engagement, a belt or chain drive, or the like.

The inner cylinder includes a slot which extends through about 180 degrees. The ends of the slot have square corners, so that the total volume of water which passes through the valve, and the relative proportion of water which passes through the primary and secondary activation and dilution apparatus, can be adjusted independently of each other. In this manner, a simple control system can be used to execute operator instructions as to the total volume of fresh water required and the proportions of fresh water to be supplied to the primary and secondary activation and dilution apparatus.

BRIEF DESCRIPTION OF THE DRAWINGS

The above-mentioned and other features of an embodiment of the invention, and the manner of obtaining them, will become more apparent, and will be best understood by reference to the following description, taken in conjunction with the accompanying drawings, in which.

DETAILED DESCRIPTION

Figure 1:
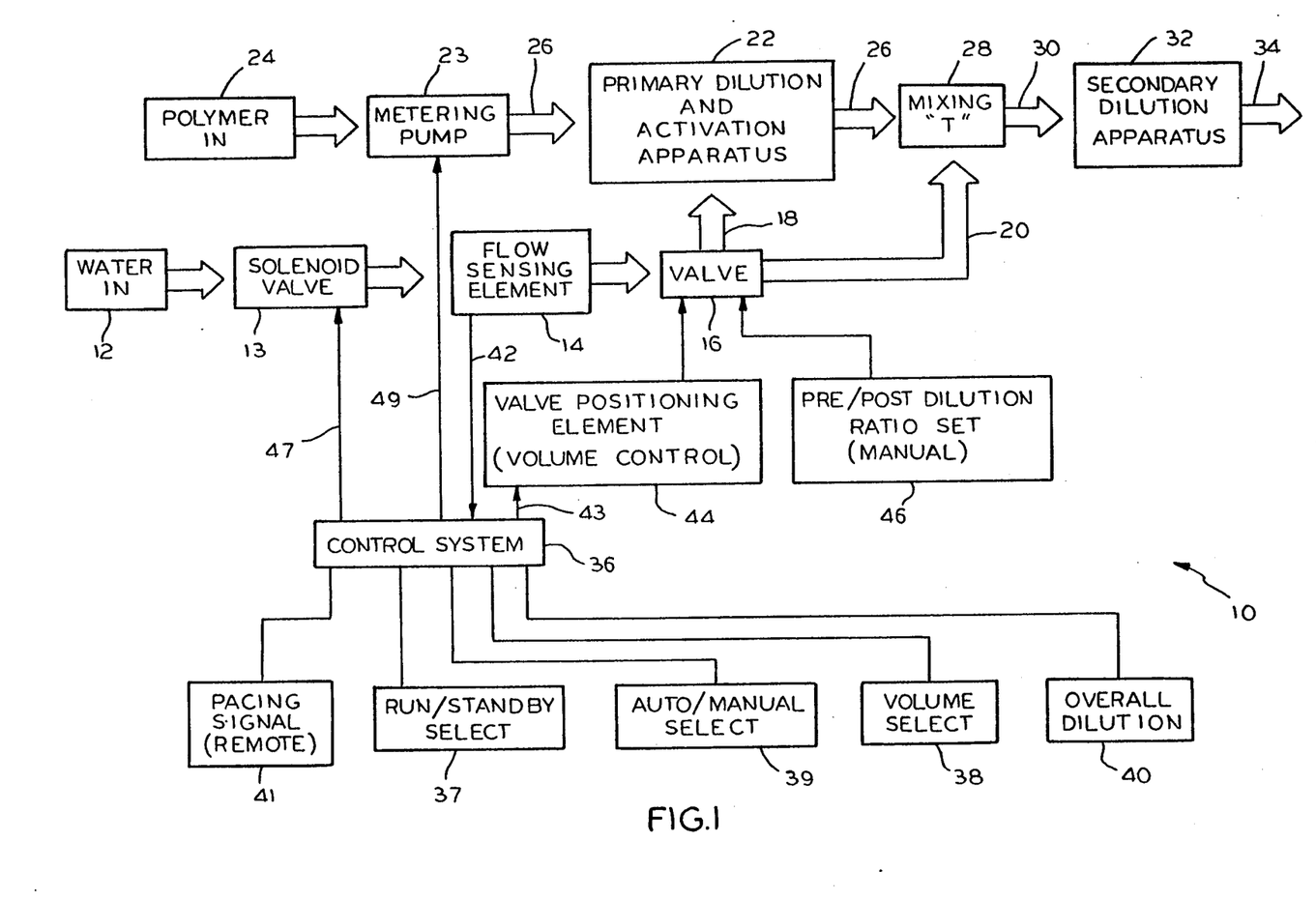
FIG. 1 is a block diagram of apparatus made in accordance with the principles of this invention.

As seen in FIG. 1, apparatus 10 is provided for diluting and activating polymers in water. The apparatus 10 is particularly suitable for preparing polymers for wastewater treatment.

The apparatus 10 includes a fresh water inlet 12, a solenoid valve 13, a primary flow sensing element 14 which measures the total amount of fresh water used in the apparatus 10, and a valve 16 which controls both the total volume of fresh water used by the apparatus 10, and the proportions in which the fresh water is divided between a first outlet 18 and a second outlet 20.

Water from the first outlet 18 is injected under pressure into primary dilution and activation apparatus 22. Polymer is placed in the primary activation apparatus 22 by a metering pump 23, through a polymer inlet 24. The water in the apparatus 22 dilutes the polymer, and the activation process begins, as will be described. The polymer/water solution leaves the apparatus 22 through an outlet 26

The polymer/water solution in the outlet 26 and additional fresh dilution water from the second outlet 20 are combined in a T-connection 28, and the resulting solution passes through an outlet 30 into secondary dilution apparatus 32, which is a commercially available static mixer having a plurality of angled baffles 33. In the apparatus 32, the polymer molecules may be further activated, as well as diluted to the proper final strength. The activated polymer leaves the apparatus 10 through an outlet 34, which leads to a storage tank (not shown) or to the wastewater which is to be treated.

The apparatus 10 also includes a control system 36. The control system 36 includes a run/standby select switch 37, a volume select input 38, an automatic/manual select switch 39, and an overall dilution select input 40, which are controlled by an operator. The control system 36 also accepts an input 42 from the flow sensing element 14, to monitor the total amount of fresh water being used in the apparatus 10. The control system 36 can accept a pacing signal when in the automatic mode.

The system 36 provides a first output 43 which controls a valve positioning element 44 in the valve 16. The positioning element 44 adjusts the total volume of fresh water used in the apparatus 10. In the manual control mode positioning element 44 is controlled by volume select inputs 38 via control system 36. In automatic mode positioning element 44 controls valve 16 by electronically comparing the total flow rate as indicated by flow sensing element 14 with the desired flow rate as represented by the pacing signal and so positioning element 16 as to produce this flow rate. A manually operated pre/post-dilution ratio setting control 46 is also provided for the valve 16. The control 46 adjusts the proportionate flow which leaves the valve 16 through the first outlet 18 and the second outlet 20.

The control system 36 also includes a second output 47 which controls the solenoid valve 13, and a third output 49 which controls the metering pump 23. Output 49 is proportional to flow signal 42 with its ratio set by overall dilution control 40. The run/standby select switch 37 disables the solenoid valve 13 and the electric motor which provides the mixing energy for the primary dilution and activation apparatus 22.

Figure 2:
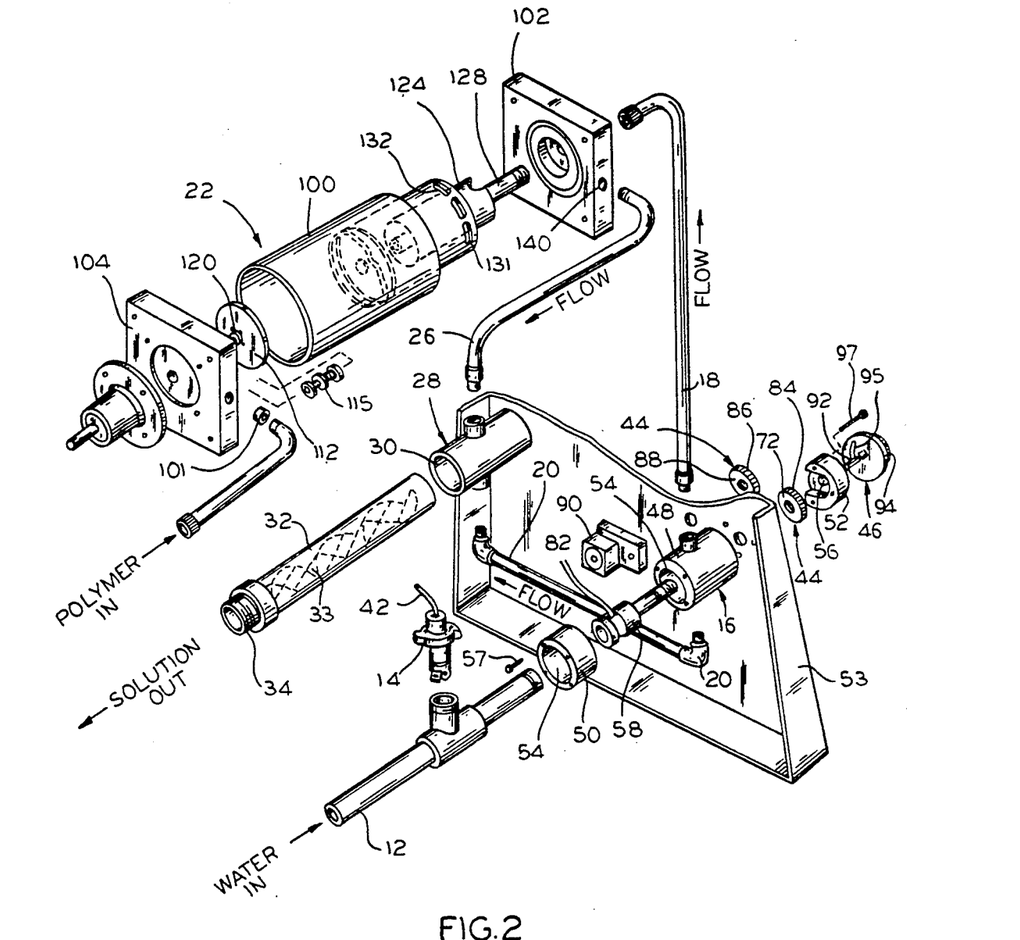
FIG. 2 is an exploded perspective view of the mechanical apparatus of FIG. 1.

The apparatus 10, including the valve 16, is shown in greater detail in FIG. 2. The valve 16 is also shown in cross-section in FIG. 3. The valve 16 includes a generally cylindrical body 48, a front housing section 50, a rear housing section 52, a first cylindrical opening 54 which extends through the front housing 50 and part of the body 48, and a second cylindrical opening 56 which extends through the rear housing portion 52 and part of the body 48 to the opening 54. One end of the valve 16 is assembled and secured to a plate 53 by several screws (not shown). Assembly of the other end of the valve 16 is completed by several screws 57.

Figure 3:
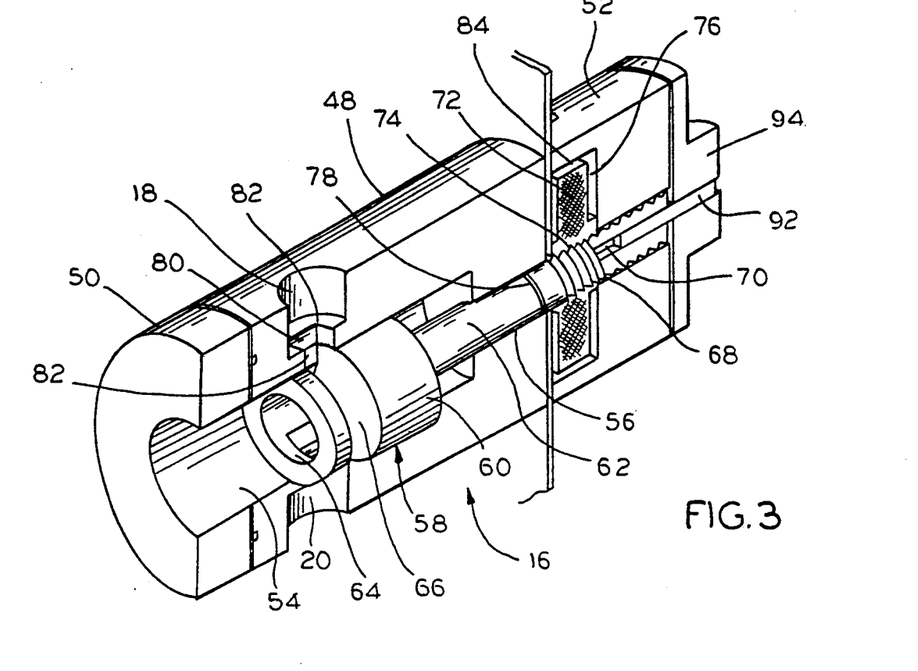
FIG. 3 is a cutaway perspective view of a valve used in the apparatus of FIG. 1.

The valve 16 also includes an inner cylinder 58. The inner cylinder 58 has a valve portion 60 which fits snugly inside the first orifice 54, and a control shaft 62, which fits snugly inside the second orifice 56. The valve portion 60 also includes a cylindrical opening 64 and a cutout portion 66.

The control shaft 62 includes a threaded portion 68 and a keyed opening 70. A rotatable wheel 72 having internal threads 74 is provided in a cavity 76 in the rear portion 52. The threads 74 engage the threads 68, as seen in FIG. 3. The wheel 72 rotates in the opening 76, but does not move axially because it is secured between the rear portion 52 and the plate 53, which together form a housing for the wheel 72.

In use, water enters the valve 16 through the opening 54 in the housing section 50. Water is prevented from escaping into the rear portion 52 of the valve 16 by an O-ring 78. The water leaves the valve 16 through the first outlet 18 and the second outlet 20, which are displaced from each other by about 180°.

While part of the outlets 18, 20 may be round to accept fittings and the like, the outlets 18, 20 include square openings 80 adjacent the opening 54. The cutout portion 66 in the cylinder 58 includes square corners 82 at the outlets 18 and 20 which are contiguous with the square openings 80 when the cylinder 58 is in a fully open position.

Figure 4A:
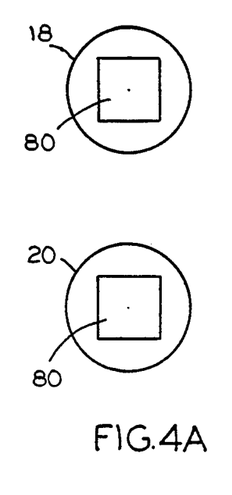
FIGS. 4A, 4B, 4C and 4D are detail views of the outlets of the valve shown in FIG. 3.
Figure 4B:
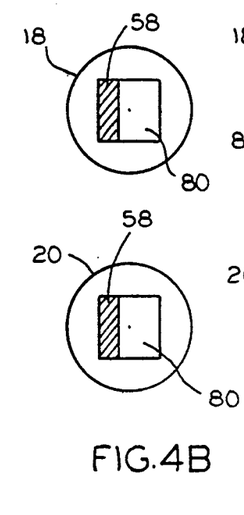
Figures 4C, 4D:
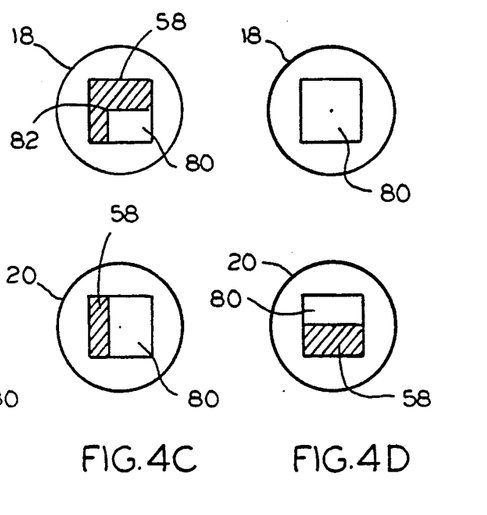

The cutout portion 66 permits the uninhibited flow of water through the openings 80 when the cylinder 58 is in the position shown in FIG. 3. Fully open outlets 18, 20 are also shown in FIG. 4A. The total volume of water which passes through the openings 80 in outlets 18, 20 can be reduced by moving the cylinder 58 axially, as in FIG. 4B, and the proportionate outputs of the outlets 18, 20 can be adjusted by rotating the cylinder 58, as in FIGS. 4C and 4D. FIG. 4B shows the total volume of water uniformly reduced by about 25%. That reduction is due to axial movement of the cylinder 58. FIG. 4C shows the uniform 25% volume reduction of FIG. 4B, with about $\frac{2}{3}$ of the total volume passing through the outlet 20 and about $\frac{1}{3}$ passing through the outlet 18. The proportionate changes are due to radial or angular movement of the cylinder 58. The cylinder 58 could, of course, be adjusted to fully cover either of the outlets 18, 20, fully exposing the other outlet. However, in practice the radial travel of the cutout portion is limited to a minimum opening of 25% on outlet 18, which feeds the primary activation and dilution apparatus. FIG. 4D shows no axial reduction, with radial adjustment which directs about $\frac{2}{3}$ of the water through the outlet 18, and about $\frac{1}{3}$ through the outlet 20. Other combinations of axial and radial flow adjustments are, of course, contemplated, including fully open and fully closed positions.

The cylinder 58 is moved axially by turning the wheel 72, to expose or cover a desired portion of the outlets 18, 20. The wheel 72 includes outer serrations 84, which engage outer serrations 86 in a second wheel 88 (FIG. 2). The wheel 88 can be operated manually, or it can be operated by the control system 36 through a control motor 90. Thus, in this embodiment the volume control system 44 includes both the motor 90, the wheel 88 and the wheel 72 The motor 90 is controlled by the control system 36.

The cylinder 58 can be rotated radially by turning a key 92 in the keyed slot 70. The key 92 can be operated manually by a handle 94. The handle 94 includes a slot 95 and a calibrated dial (not shown). The handle 94 is adjusted to the pre/post-dilution proportion desired using the calibrated dial, and is secured in place by tightening a screw 97. The pre-dilution water flows through the outlet 18, and the post-dilution water flows through the outlet 20. The screw 97 passes through the slot 95, and is threaded in an opening in the rear housing section 52. The slot 95 limits the proportional split in the range of 100% pre-dilution, 0% post-dilution to 25% pre-dilution, 75% post-dilution.

With the configuration shown in FIGS. 2, 3 and 4, including the square portions 80 in the outlets 18, 20, the total volume of water which passes through the valve 16, and the proportions in which the water is released through the outlets 18, 20, can be selected and changed independently of each other. Among other things, this simplifies the control system 36, which need not separately monitor the outputs at the outlets 18 and 20 and make multiple readjustment.

The primary activation apparatus 22 is shown in detail in FIGS. 2, 5, 6, 7 and 8. The apparatus 22 includes a cylindrical housing 100, a top 102 and a bottom 104. The bottom 104 includes a first polymer inlet 99 having a check valve 101, and a second polymer inlet 103. The inlet 103 is provided so that different types of polymers can be used in the apparatus 22 more easily. For example, solution polymers might be placed through the inlet 103, while emulsion polymers could be used in the inlet 99. These polymers are not compatible so the use of a single inlet would be less practical because the inlet would have to be cleaned every time the type of polymer was changed. The inlet 103 is closed by a plug 105 when it is not in use.

Figure 5:
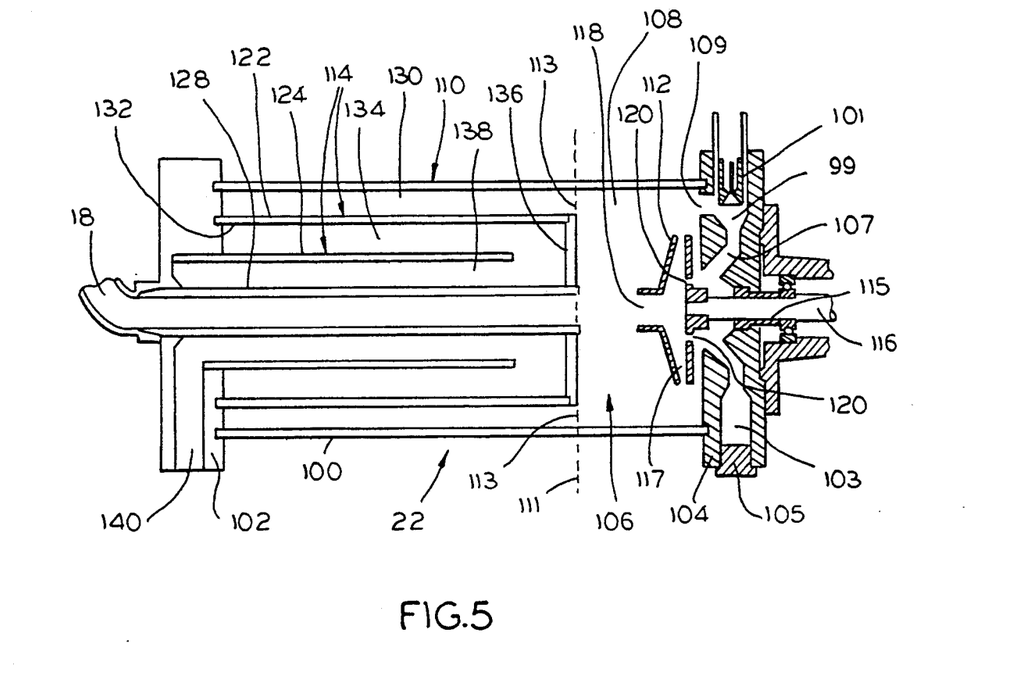
FIG. 5 is a cross-sectional view of the primary dilution and activation apparatus shown in FIG. 1.

The check valve 101 is secured in a side of the bottom 104 so that it can be removed for cleaning and/or replacement easily, without disassembling the apparatus 22. The bottom 104 also includes a recirculation channel 109 which receives flow from the high pressure area that exists at the periphery of zone 106 and directs it past the check valve 101 and into the low pressure area at the center of the impeller through ports 120. The polymer delivered through check valve 101 is carried by this flow through a channel 107 into the high shear zone in a very short time span owing to the high rate of flow through channel 107.

The apparatus 22 includes an interior mixing chamber 106 which is divided into a high shear mixing zone or chamber 108 and a low shear mixing zone or chamber 110. A line 111 is provided in FIG. 5 to show the approximate point of transition between the high shear zone 108 and the low shear zone 110. An impeller 112 is provided in the high shear mixing chamber 108, and a baffle assembly 114 is provided in the low shear mixing chamber 110.

The impeller 112 is rotated by a shaft 116. A seal 115 is provided to isolate the interior of the mixing chamber from a motor (not shown) which rotates the shaft 116 at a desired speed. The impeller 112 includes several interior channels 117, an inlet and central opening 118, and a plurality of inlet orifices 120.

Figure 6:
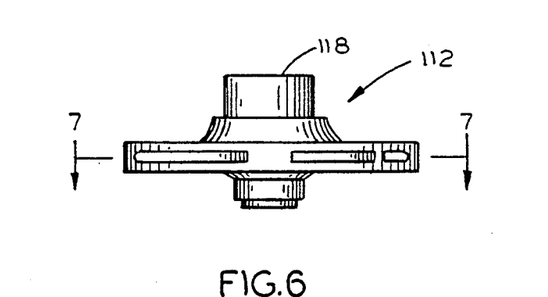
FIG. 6 is an elevational view of an impeller used in the apparatus of FIG. 2.
Figure 7:
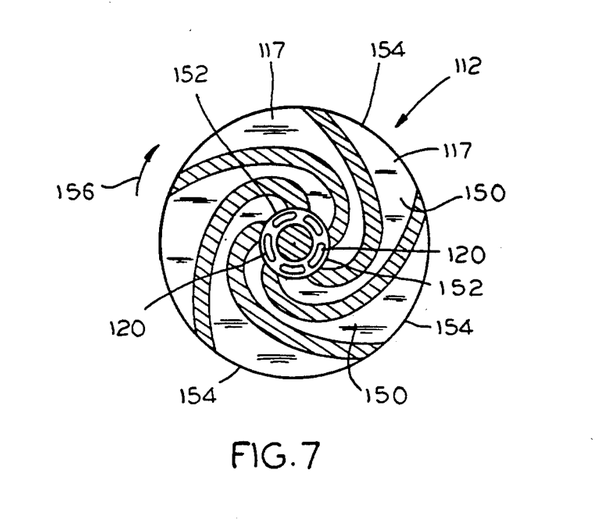
FIG. 7 is a cross-sectional view of the impeller of FIG. 5, taken along lines 6—6 in FIG. 5.
Figure 8:
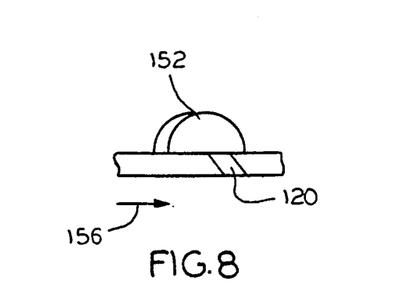
FIG. 8 is an elevational view of a portion of the impeller of FIG. 6.

The impeller 112, shown in greater detail in FIGS. 6, 7 and 8, includes a plurality of internal openings 150 each having an inlet 152 and an outlet 154. The impeller 112 is rotated by a motor (not shown) in the direction of arrow 156. The openings 120 (FIG. 8) are inclined at an angle which orients the leading edge of each opening 120 towards the incoming polymer (the direction 156 in FIG. 8), so as to more easily draw the polymer molecules through the openings 120 and into the inlets 152 of the internal openings 150.

Polymer and water enter the high shear mixing chamber 108 separately through the valve 101 and the inlet 118, respectively. The polymer is drawn into the impeller 112 through the inlet orifices 120, and the water is drawn through the impeller inlet 118. The water and polymer are mixed and forced by centrifugal force through the channels 117 and into the chamber 108. Some of the mixture recirculates through the channel 109. In any event, the polymer molecules are subjected to relatively high shear forces for a relatively short period of time in the chamber 108. The continuing flow of incoming fresh water displaces the polymer/water solution out of the high shear mixing zone chamber 108 into the low shear mixing chamber 110 through an opening 113 along the line 111. The baffle assembly 114 includes concentric cylinders 122, 124 and 128. The baffle 122 forms an annular chamber 130 with the cylinder 100. The chamber 130 extends from the bottom of the low shear mixing zone 110 to about the top 102.

Elongated orifices 132 are included in the baffle 122. The polymer/water mixture in the chamber 130 flows in an axial direction away from the high shear mixing chamber 108, and passes through the orifices 132 into a second annular chamber 134 which is formed by the cylinder 122 and the cylinder 124. The solution flows in the reverse axial direction to the end of the cylinder 124, and is channeled by a bottom plate 136 into a third annular chamber 138, formed by the cylinder 124 and the cylinder 128. The solution reverses axial direction flow again, and leaves the chamber 138 through an opening 140, which is connected to the outlet 26. In this manner, the solution travels through an extended path through the mixing chamber 110, but continues to swirl in a single direction in the chamber 110 due to the force created by the rotating impeller 112. The swirling of the solution is substantially unobstructed in the mixing chamber 110, and the shear conditions in the chamber 110 continuously decline as the solution passes through the low shear mixing chamber 110. However, mixing is passive because there is no impeller in the chamber 110, in contrast to the active mixing which occurs in the chamber 108, which is active because of the rotating impeller in the chamber 108

Figure 9:
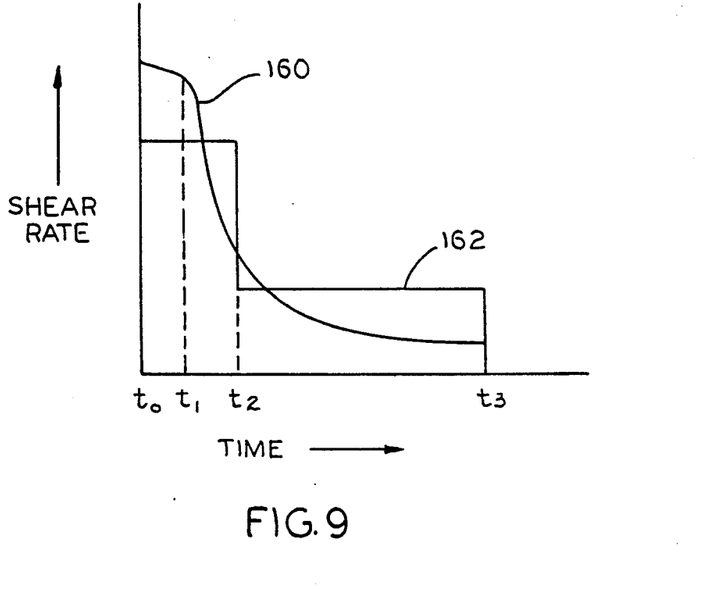
FIG. 9 is a graph which compares the operation of the primary dilution and activation apparatus of FIGS. 2 and 5 with the operation of other mixing apparatus.

FIG. 9 compares the shear rates over time created in the apparatus 22 with the shear rates created in known two-stage mixers. The shear rate 160 generated by the apparatus 22 is high until time $t_1$ and then declines in a gradual, continuous manner until time $t_3$, when the diluted polymer leaves the apparatus 22. The shear rate 162 generated in known two-stage mixers is lower than the shear rate 160 between times $t_0$ to $t_1$, but is still relatively high until time $t_2$, when it drops almost immediately to a lower shear rate until time $t_3$. The diluted polymer leaves the mixer at time $t_3$. While the times $t_1$, $t_2$ and $t_3$ can be adjusted as desired, the residence time in the zone 114 ($t_3-t_1$) is generally longer than the residence time in the second zone of a two-stage mixer ($t_3-t_2$).

Typical flow rates for the apparatus 22 are between about 2 gallons of fresh water per minute (gpm) and about 20 gpm. An additional flow of fresh water at the rate of between about 2 and 20 gpm can be provided through the outlet 20, for a total flow of between about 4 and 40 gpm.

The apparatus 22 can be designed to hold about 3 gallons of liquid. The zones 108 and 110 are designed so that the residence time of the polymer and water in the zone 108 is about 20%-25% of the total residence time in the apparatus 22, and the residence time in the zone 110 is about 75%-80% of the total residence time. For example, at a flow rate of about 2 gpm, the total residence time could be about 90 seconds, with about 20 seconds in the zone 108 and about 70 seconds in the zone 110. Under these conditions, a flow rate of about 20 gpm would result in a total residence time of about 9 seconds, with about 2 seconds in the zone 108 and about 7 seconds in the zone 110. Sufficiently high shear conditions could be obtained if the impeller 112 were rotated at between about 1800 rpm and about 3400 rpm.

Figure 10:
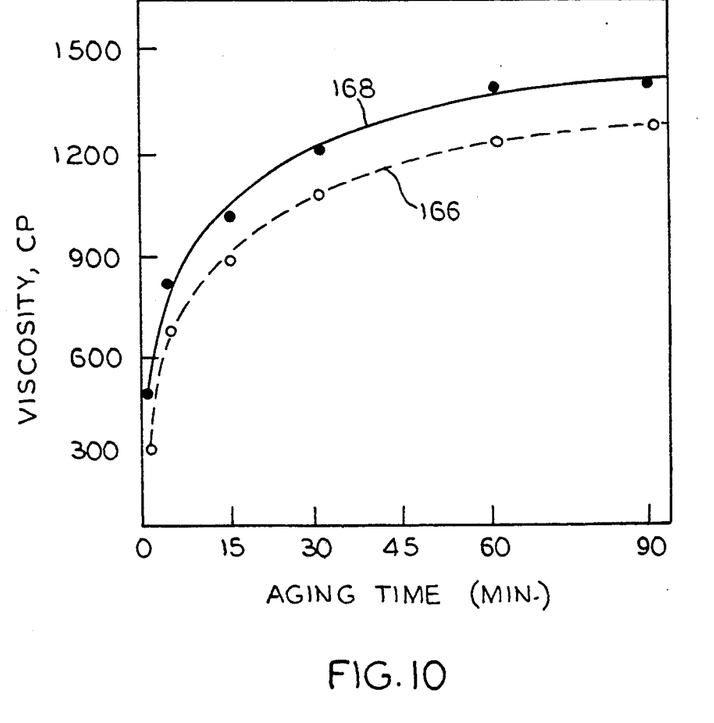
FIG. 10 is a graph which compares the results obtained with the primary dilution and activation apparatus of FIGS. 2 and 5 with the operation of other mixing apparatus.

FIG. 10 illustrates the improvement in polymer activation which can be obtained with the apparatus 22, as compared with known two-stage mixers. The improvement can be measured by the increase in viscosity at a given time after mixing, and also by the aging time after mixing which is required to reach a particular viscosity.

The polymer used in creating FIG. 10 was Percol 710, at a temperature of 20° C. and a concentration of about 0.48%-0.49%. The impeller in the known two-stage mixer was turned at about 525 rpm, which is considered a preferred speed for that equipment. The viscosity was about 310 centipoise (cp) initially, 1240 cp after 60 minutes, and 1280 cp after 90 minutes, as seen in line 166. Using the apparatus 22 at 3400 rpm, the initial viscosity was 480 cp, the viscosity after 60 minutes was 1380 cp, and the viscosity after 90 minutes was 1410 cp, as seen in line 168. A viscosity of 1230 cp was reached after only 30 minutes. Thus, using this invention, the maximum viscosity, after 90 minutes of aging time, was increased about 10%, and the aging time required to reach over 1200 cp was decreased by 50%, from about 60 minutes to less than 30 minutes.

In use, an operator can select or change the total volume of water required for a particular application and set the volume through the volume select input 38 in the control system 36. The proportion of fresh water which is directed to the primary activation apparatus 22 and the secondary activation apparatus 32 can also be selected or changed, through the mixture select input 40. The volume and mixture can be changed separately, without affecting each other.

The many advantages of this invention are now apparent. The polymer molecules are better activated, and the entire system can be controlled by merely monitoring the total volume of fresh water supplied to the system. The control system is simpler because the volume of water and the proportions of water released through the outlets 18, 20 can be adjusted independently.

While the principles of the invention have been described above in connection with specific apparatus and applications, it is to be understood that this description is made only by way of example and not as a limitation on the scope of the invention.

We claim:

1. A valve for controlling the flow of liquid comprising:
   a) an inlet for allowing liquid to flow into said valve;
   b) at least two outlet means for allowing a predetermined amount of the liquid to pass from said valve; and
   c) means for controlling the total amount of liquid which passes through said at least two outlet means and the proportion of the liquid which passes through each one of said at least two outlet means, respectively, said means for controlling being capable of adjusting said total amount and said proportion independently of each other, with said proportion being controlled by one adjustment, said means for controlling comprising a hollow cylinder which is open at one end and completely closed at the other end, said cylinder having a slot which extends radially to fully expose first and second ones of said at least two outlet means simultaneously when said cylinder is in a first preselected angular position, to fully cover one of said first and second ones when said cylinder is in a second preselected angular position, or to fully expose one and to partially cover the other of said first and second ones when said cylinder is in a third preselected angular position.

2. A valve for controlling the flow of liquid comprising:
   a) an inlet for allowing liquid to flow into said valve;
   b) at least two outlet means for allowing a predetermined amount of the liquid to pass from said valve; and
   c) means for controlling the total amount of liquid which passes through said at least two outlet means and the proportion of the liquid which passes through each one of said at least two outlet means, respectively, said means for controlling being capable of adjusting said total amount and said proportion independently of each other, with said proportion being controlled by one adjustment,
   said means for controlling comprising a hollow cylinder which is open at one end and closed at the other end, and has a cylindrical wall extending from said open end to said closed end said cylindrical wall having a slot which extends radially to fully expose first and second ones of said at least two outlet means simultaneously when said cylinder is in a first preselected angular position, to fully cover one of said first and second ones when said cylinder is in a second preselected angular position, or to fully expose one and to partially cover the other of said first and second ones when said cylinder is in a third preselected angular position.

3. The valve of claim 2 wherein said slot has square corners.

4. The valve of claim 2 wherein said cylinder comprises a solid section adjacent said slot, said valve control means further including means for rotating said cylinder between said first, second and third angular positions, and means for moving said cylinder axially to expose or cover a desired portion of said first and second ones.

5. A method for controlling the flow of liquid comprising:
   a) allowing liquid to flow into a valve through an inlet, said valve including a hollow cylinder having an open end and a closed end, and a radially extending slot intermediate said open end and said closed end;

b) allowing a predetermined amount of the liquid to pass from said cylinder through at least one of a first and second outlet; and
c) controlling the total amount of liquid which passes through said valve, and the proportion of liquid which passes through said first and second outlets, respectively, said total amount and said proportion being controlled independently of each other, with said proportion being controlled by a single adjustment, said proportion controlling being operable for rotating said slot to an angular position whereby said slot fully exposes one of said first and second outlets and partially exposes the other of said first and second outlets.

* * * * *